Figure 1:
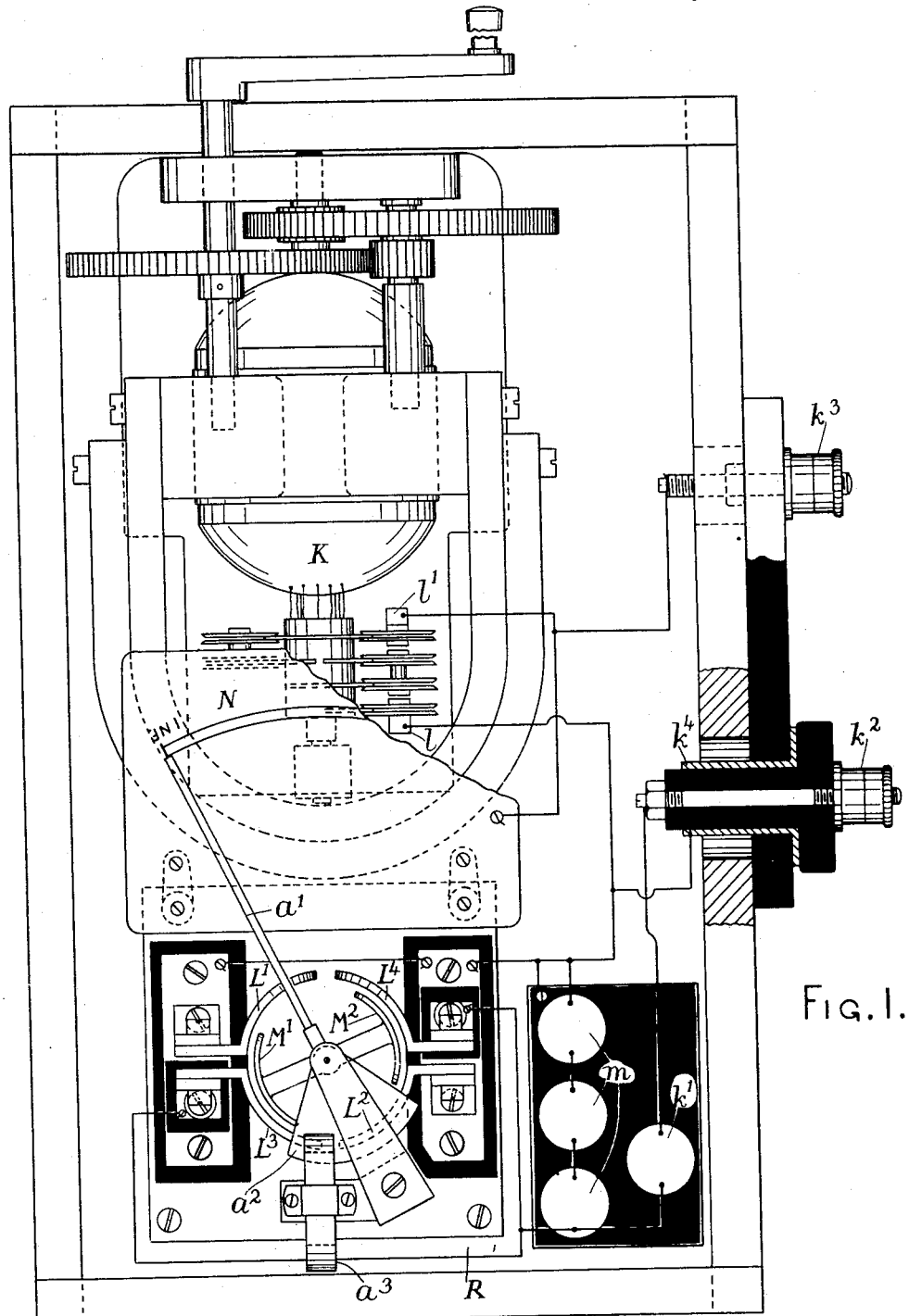

No. 810,330. PATENTED JAN. 16, 1906.
S. EVERSHED.
APPARATUS FOR MEASURING ELECTRIC RESISTANCES.
APPLICATION FILED FEB. 27, 1904.

3 SHEETS—SHEET 1.

WITNESSES
INVENTOR
Sydney Evershed
ATTORNEYS

No. 810,330. PATENTED JAN. 16, 1906.
S. EVERSHED.
APPARATUS FOR MEASURING ELECTRIC RESISTANCES.
APPLICATION FILED FEB. 27, 1904.

3 SHEETS—SHEET 2.

WITNESSES
INVENTOR
Sydney Evershed
BY Richards
ATTORNEYS

No. 810,330. PATENTED JAN. 16, 1906.
S. EVERSHED.
APPARATUS FOR MEASURING ELECTRIC RESISTANCES.
APPLICATION FILED FEB. 27, 1904.

3 SHEETS—SHEET 3.

UNITED STATES PATENT OFFICE.

SYDNEY EVERSHED, OF STREATLEY, ENGLAND, ASSIGNOR TO HIMSELF, AND EVERSHED AND VIGNOLES LIMITED, OF CHISWICK, ENGLAND, A CORPORATION.

APPARATUS FOR MEASURING ELECTRIC RESISTANCES.

No. 810,330.         Specification of Letters Patent.         Patented Jan. 16, 1906.

Application filed February 27, 1904. Serial No. 195,611.

*To all whom it may concern:*

Be it known that I, SYDNEY EVERSHED, a subject of the King of Great Britain and Ireland, residing at Streatley, in the county of Berks, England, have invented a certain new and useful Improvement in Apparatus for Measuring Electric Resistances, of which the following is a specification.

This invention relates to apparatus used for measuring electric resistance, and particularly insulation resistance, and it is specially applicable as a portable testing set intended for testing and measuring the insulation of electric circuits at voltages commensurate with the working voltage of the circuits. Such testing sets as heretofore known generally comprise a portable hand-dynamo or other convenient source of electric energy and a direct-reading ohmmeter or equivalent instrument for the measurement of resistance. The ohmmeter in such known sets has been of the ordinary type, in which fixed coils act upon a moving magnet. This type of instrument has several disadvantages for this particular purpose. The magnetic fields of the coils are necessarily feeble when very high resistances are under test, so that even when the magnet system is made nearly astatic by any of the well-known methods stray magnetic forces are apt to produce errors in the indications of the ohmmeter. Hence if a hand-dynamo is used as the source of current it must be placed at some little distance from the ohmmeter while in use. For this reason the ohmmeter and dynamo have been heretofore fitted in separate boxes or cases, and before they can be brought into use it is necessary to electrically connect the two. The operative forces upon the needle or magnet system of the ohmmeter are feeble, even when the coils are formed of an enormous number of turns of the finest procurable wire, so that very delicate pivoting of the moving system is essential to avoid errors due to friction. Testing sets of the type referred to have not been available for testing insulation resistances above about one hundred megohms, because the limit of sensitiveness in the ohmmeters heretofore used has been reached by winding the coils with the finest procurable wire, and it has been impracticable to further increase the operative forces.

The object of this invention is generally to increase the portability, scope of utility, and convenience of apparatus of the kind specified by the use of an indicating instrument based upon principles which render its working and indication entirely independent of stray magnetic fields, so that the indicating instrument can be used in quite close proximity to the hand-dynamo in one box or case, thus greatly increasing the portability and convenience of the apparatus. For high pressures an electrostatic electrometer is most convenient.

This instrument may be well known in its application for other purposes; but in applying it for the purpose of this invention I modify and adapt it with special reference to the particular and novel functions it is intended to perform in ways hereinafter described.

It is an essential feature of a testing set of the type hereinafter described that the index of the indicating instrument shall range over a scale in ohms or megohms, and it is to be understood that in carrying out this invention I make the instrument direct-reading in this sense.

To enable a quadrant-electrometer to be used for the direct indication or measurement of electric resistance, I reduce the control provided by the torsion of the suspension to a negligible amount or eliminate torsional or other control altogether by freely pivoting the movable system of the instrument, as is commonly done in electrostatic voltmeters. To measure an unknown resistance, a known resistance is connected in series with it and the circuit supplied with current from a dynamo. The two quadrants or pair of quadrants of an electrometer are connected one to each end of the known resistance and the electrometer-needle is connected to that terminal of the dynamo which has the opposite polarity to that of the quadrants. The resistances $m$ and $k'$ are shown in insulating-bobbins. With these connections the deflection of the needle depends upon the ratio of the unknown resistance to the known, and hence the electrometer when so arranged performs the same function as an ohmmeter, over which it has the advantage of greater simplicity of working mechanism.

In combining an electrometer with a dynamo for high-pressure testing I fix both pieces of apparatus in a suitable box, and any possible errors due to the friction of the pivoted-needle system are obviated by the vibrations set up by the rapid rotation of the dynamo-armature, which are communicated to the framework of the electrometer.

It is useful to have means at hand for actually measuring the voltage applied to the insulation under test, and accordingly I provide a hair-spring upon the axle of the needle system. Normally the outer end of this spring is entirely free, but a fixed clamp is provided, which may be brought into action to clamp and fix the outer or free end of the spring by means of a suitable key outside the box containing the apparatus. When the spring is so clamped, the electrometer may be used as a voltmeter, a second subsidiary scale of volts being marked upon the dial for that purpose. This also enables the efficient working of the dynamo to be easily checked.

In carrying out this invention I insure freedom from errors due to imperfect insulation of the several parts of the instruments by applying the well-known principle of Price's guard-wire, a device commonly employed in testing submarine cables and well adapted for the purpose in view, and in order that this invention may be the better understood I will now proceed to describe the same with reference to the drawings hereto annexed and to the letters marked thereon.

Figure 2:
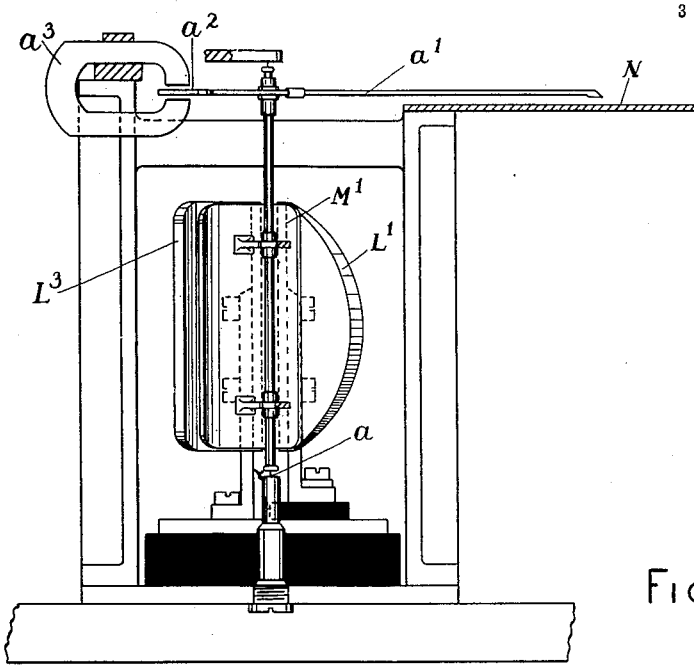
Figure 3:
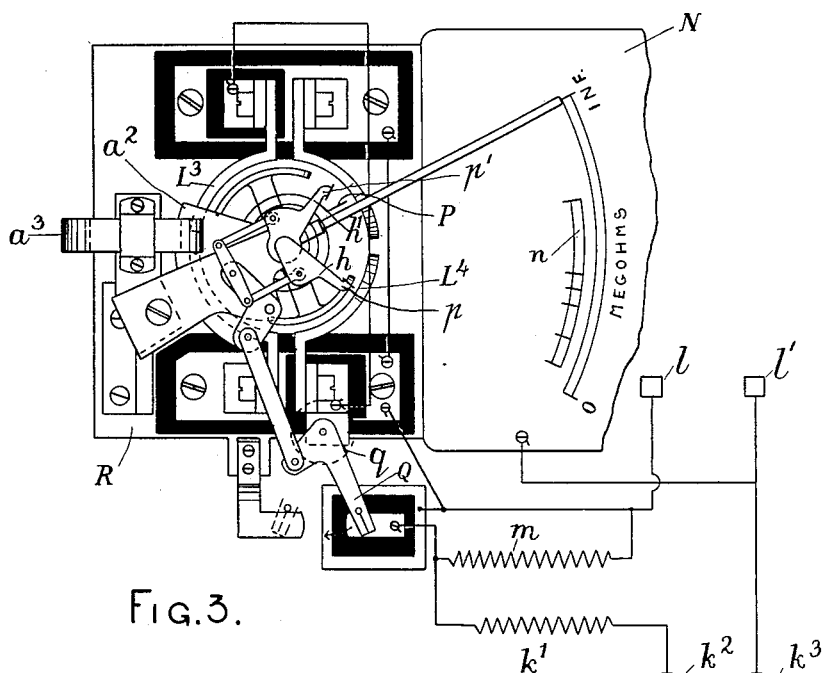
Figure 4:
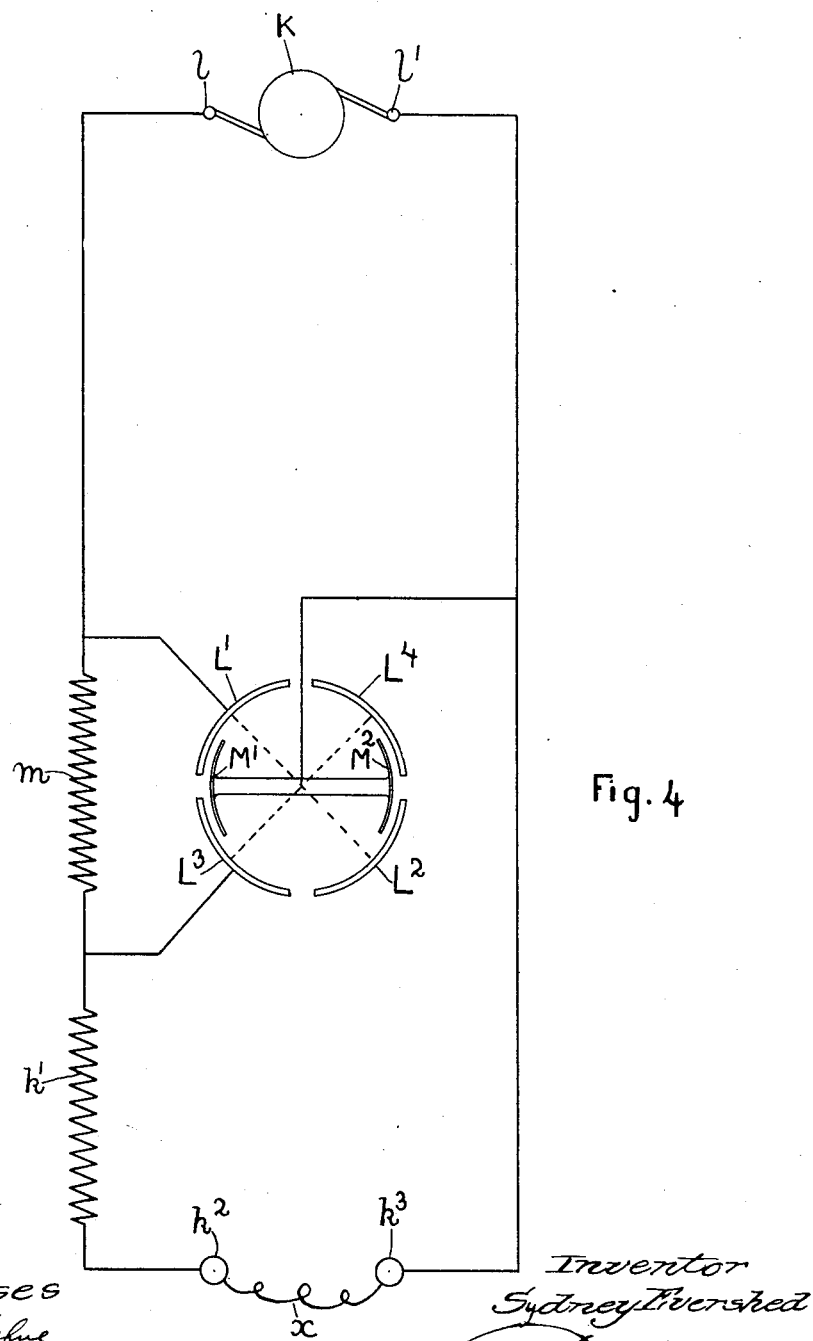

Figure 1 illustrates a high-tension testing apparatus comprising a dynamo and an electrometer in one box. Fig. 2 is a sectional elevation of a suitable electrometer. Fig. 3 shows a device for enabling the electrometer to be used alternatively for measuring resistances or indicating volts. Fig. 4 is a diagram of the electrical connections.

The electrometer is of the type in which cylindrical quadrants $L'$ $L^2$ and $L$ and $L^4$ act upon a pair of movable pieces $M'$ $M^2$. The quadrants are coupled in pairs in the usual manner, one pair $L'$ and $L^2$ being directly connected to one terminal $l$ of the high-tension dynamo K, while the other pair $L^3$ $L^4$ is connected through a resistance $k'$, carried in an insulating-bobbin, to a terminal $k^2$. I prefer to insert this resistance $k'$ between the quadrants $l^3$ $l^4$ and the terminal $k^2$ to enable the zero-mark upon the scale to be brought to required position. The two pairs of quadrants are connected together by means of a resistance $m$, carried in insulating-bobbins, and since this use of an electrometer consists, essentially, in measuring the ratio of the voltage drop over a known resistance to that of the unknown resistance it is necessary that the resistance $m$ should bear a sensible proportion to the resistance which the instrument is to measure. For example, if it is desired to measure insulation resistance of about one hundred megohms, then the resistance $m$ should be at least one megohm. The motion of the index $a'$ of the movable axis $a$ is made as nearly aperiodic as possible by means of a magnetic brake, which is conveniently provided by means of a sector-plate of aluminium $a^2$, which moves between the poles of a magnet $a^3$. To avoid effects due to internal leakage, I apply the guard principle to the various insulating-pieces. For example, the quadrants $L'$ $L^2$ being directly coupled to one terminal of the dynamo, I attach the insulators which carry the other pair of quadrants to metal plates in electric contact with the first pair. Similarly the terminal $k^2$ has a guard $k^4$ in connection with the same terminal of the dynamo, and the resistances $m$ and $k'$ are mounted upon insulators similarly guarded.

To obviate stray forces acting upon the movable system of the electrometer, I connect the dial N and other parts of the framework which carries the movable system and which is mounted on the plate R so that they are all at one potential. For the same purpose I may completely inclose the electrometer by a metal case electrically connected to the framework. The methods by which a suitable scale of an electrometer may be adapted to any given requirements are well understood and do not form a part of my present invention.

In Fig. 3 I show a hair-spring P fixed upon the axle of an electrometer in order to provide for an indication or measurement of the voltage when required. Normally the outer end of the spring is free and has no control upon the movable system; but when it is desired to indicate a voltage two pallets $p$ $p'$ are brought together, clamping the free end of the spring P firmly between them, and so providing a spring control to the movable system. At the same time the internal connections of the electrometer are charged by means of a switch Q, the quadrants $L^3$ $L^4$ being disconnected from the resistance $m$ and put in communication with the framework R of the electrometer, which is at the same potential as the movable system. With this connection the electrometer acts as a voltmeter. I provide an auxiliary scale $n$ marked in volts or thousands of volts. The pallets $p$ $p'$ and the switch Q are both operated by means of a knob $q$ on the outside of the box containing the apparatus.

Having now described my invention, what I claim, and desire to secure by Letters Patent, is—

1. In combination, a generator of electric current; an electrometer in close proximity to the generator having a rotatable index-pointer and segmental piece thereon, in stable equilibrium throughout its range as regards gravitational or torsional forces; four metal quadrants connected electrically in two pairs, grouped about the spindle and segments of the said rotatable index-pointer; an electrical resistance in the connection between one pair of quadrants and an external terminal; an electrical resistance connecting the two pairs of quadrants; and adapted to cause a difference of potential between them and a portable box inclosing the whole apparatus.

2. In combination, a generator of electric current; an electrometer in close proximity to the generator, having a rotatable index-pointer in stable equilibrium throughout its range as regards gravitational or torsional forces; electrically-guarded insulations to avoid leakage; and a portable box inclosing the whole apparatus.

3. In combination, a generator of electric current; an electrometer in close proximity to the generator, having a rotatable index-pointer in stable equilibrium throughout its range as regards gravitational or torsional forces; two pairs of quadrants grouped about the rotatable index-pointer; insulations under one pair of quadrants, about an external terminal, and under the resistances; guard metal plates adjoining said insulations; connections to the said guard-plates from a terminal of the current-generator to avoid leakage; and a portable box inclosing the whole apparatus.

4. In combination, a generator of electric current; an electrometer in close proximity to the generator, having a rotatable index-pointer in stable equilibrium throughout its range as regards gravitational or torsional forces; a sector metallic plate upon the index-pointer axis, a magnet acting upon the said sector-plate as a magnetic brake; and a dial-plate with the framework carrying the movable system metallically connected together and to one terminal of the electric-current generator.

In witness whereof I have hereunto set my hand in presence of two witnesses.

SYDNEY EVERSHED.

Witnesses:
  JOHN C. FELL,
  CHARLES CARTER.